Patented June 29, 1954

2,682,147

UNITED STATES PATENT OFFICE 2,682,147

ADJUSTABLE NOZZLE FOR EXHAUST GAS

Herbert H. Ferris, Jr., San Diego, Calif., assignor to Rohr Aircraft Corporation, Chula Vista, Calif., a corporation of California Application June 16, 1951, Serial No. 232,018

1 Claim. (Cl. 60—35.6)

This invention relates to variable discharge nozzles and is particularly, although not necessarily, adapted for use in connection with the tailpipe of an aircraft jet engine.

It is an object of the invention to provide means for easily controlling and varying the area of the exhaust gas discharge opening of a jet engine tailpipe.

Another object is to provide a device of this character which is capable of adjustment to any desired intermediate setting between its large and small openings.

A further object is to provide a discharge opening composed of a minimum number of movable parts in contact with hot gases and a single operating member arranged to operate the parts simultaneously.

Another object is to provide a control means for the discharge opening in which the operating parts are not subject to the high heat of the exhaust but are kept at relatively low operating temperatures.

A still further object is to provide a device of this character which is substantially leakproof.

Figure 1:
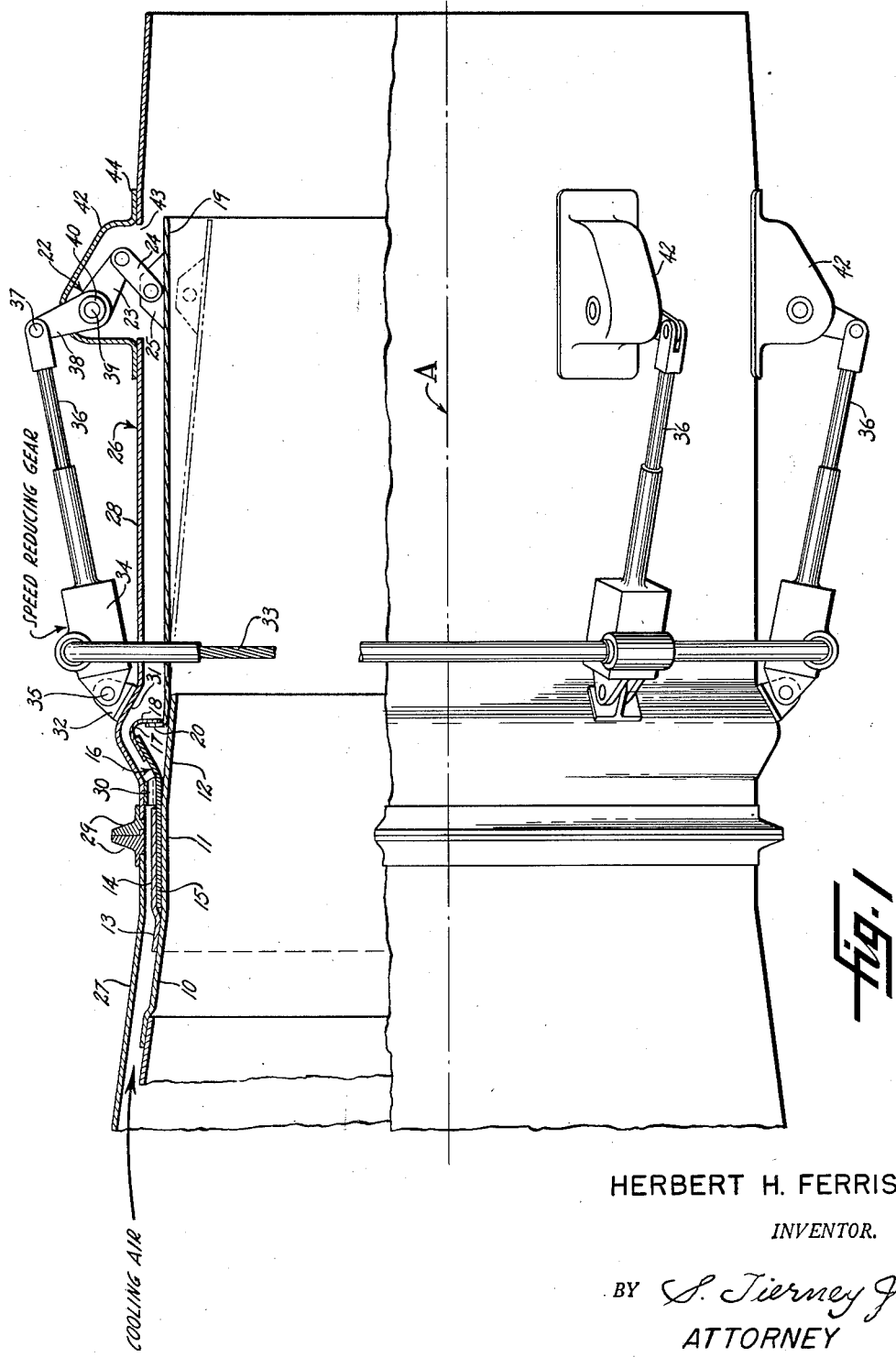
Figure 2:
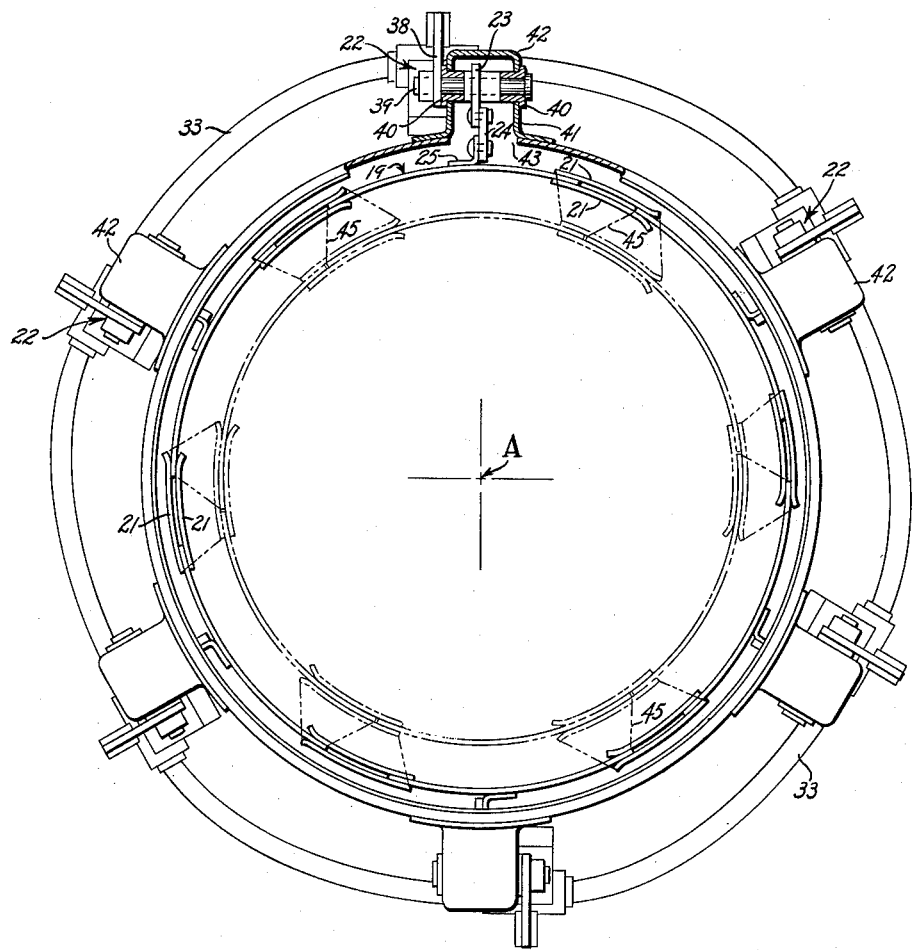

Further objects will become apparent as the description of the nozzle proceeds. For a better understanding of the invention, reference is made to the accompanying drawings, in which:

Figure 1 is a side view, partly in section, of a nozzle embodying the invention and, Figure 2 is an end view, partly in section, of the nozzle shown in Figure 1.

When a jet aircraft is taking off or climbing, it has a relatively low air speed, the efficiency of the jet engine being low at this time. Methods have been developed for increasing the performance characteristics of the basic jet engine for increased thrust at take-off and climb and for extra bursts of speed during normal flight. Such methods for increasing jet engine thrust are known as thrust boosters or thrust augmentors.

One of the more promising of these thrust augmentation methods involves the injection and burning of additional fuel in the tailpipe gases downstream of the turbine. The burning of additional fuel increases the temperature of the gases in the tailpipe with a corresponding increase in the volume of the gases, therefore, since optimum jet nozzle area is different with afterburning, a suitable method of varying the exit area is necessary. This invention provides an adjustable nozzle whereby the area of the issuing jet may be kept at any desired value between minimum and maximum.

In the nozzle illustrated, the exhaust gases of an airplane jet engine (not shown) issue from a tailpipe 10 having an intermediate cylindrical wall portion 11 and terminating in a wall portion 12 having the shape of a hollow conical frustum. Secured to pipe 10 is a ring 13 having a cylindrical portion 14 spaced from wall 11 to slidingly receive one end 15 of a flap-retaining member 16, thereby providing a slip joint connection between the tailpipe 10 and nozzle. Member 16 is preferably formed of two pieces, as shown, and is made of stainless steel or other flexible material and bent over at 17 to provide a radially disposed flexible ring 18. A set of six interengaging flaps 19 form the movable portion of the nozzle, each flap having a bent over end 20 which is secured to ring 18 by welding or other suitable means. Ring 18 thus serves as a pivotal anchor for the flaps at the same time retaining their upstream ends in sealing contact with wall 12. Each flap 19 has secured along one longitudinal edge thereof, a pair of spaced apart sealing strips 21 between which the adjacent flap has a sliding fit, thus providing leakproof connections between the flaps. The flaps are preferably made of stainless steel which is thin and flexible enough to permit them to flex substantially as the nozzle is adjusted to different settings. The flaps are adjusted simultaneously by a set of bellcranks 22 each having an arm 23 which is connected by a link 24 to an angle shaped support 25 welded or otherwise secured to flap 19. The bellcranks 22 are supported on a shroud 26 in a manner to be described.

Shroud 26 is spaced from tailpipe 10 and the nozzle by a distance sufficient to permit the passage of a current of cooling air between them, the air being supplied by a compressor or other source (not shown) on the aircraft. Shroud 26 is composed of two generally cylindrical shaped tubes 27 and 28 which are connected together by a pair of flanges 29. A plurality of equally spaced apart hat supports 30 (only one of which is shown) are secured to tube 28 and flap retainer 16. Tube 28 is provided with an inclined wall portion 31 to which is secured six brackets 32.

The means for adjusting the flaps 19 comprises a flexible drive shaft 33 rotated by an electric motor (not shown), shaft 33 driving sets of speed reducing gearing mounted within the housings 34 (see Figure 2). This gearing may be of the worm gear, screw and nut or other known type capable of effecting a large decrease in speed and a corresponding increase in torque. Each housing 34 (see Figure 1) is connected by a pivot pin 35 to a bracket 32 and the gearing actuates a rod 36 connected by pivot pin 37 to an arm 38 of bellcrank 22. Bellcrank 22 is secured to a shaft 39 journalled in a pair of bearings 40 which are carried by the longitudinally extending parallel walls 41 of a dome shaped housing 42. Six equally spaced apart openings 43 are cut in tube 28 and housings 42 are attached to the tube over these openings by having the lower ends of the housing walls bent out, as at 44, and welded to tube 28.

With the flaps 19 in their outer position, the wall of the nozzle is substantially cylindrical in shape and its orifice opening is a maximum to provide the desired jet thrust. To decrease the nozzle opening, the drive motor (not shown) is operated in the proper direction to cause shaft 33 to rotate so as to push rods 36 out, thereby moving the downstream ends of the flaps in towards the nozzle axis A. During this motion, the edge of one flap moves further in between the strips 21 of the next adjacent flap, as indicated by the dash lines 45 of Figure 2. Also the flaps bend somewhat so that their downstream ends constantly form a circular orifice, and member 16, including ring portion 18, bends in a manner to retain the upstream ends of the flaps in sealing contact with conical wall 12. In this action member 16 functions in the manner of a single convolution of a bellows. The motor rotation may be continued until the flaps reach their innermost position, as indicated in dash lines, when the nozzle orifice is a minimum. To again increase the nozzle orifice, the motor is rotated in the reverse direction, which will cause the downstream ends of the flaps to move away from axis A, as will be apparent.

It will be noted that the mechanism for adjusting the nozzle orifice is not subjected to the high heat of tailpipe 10, the major portion of this mechanism being located outside of shroud 26 and that portion located within the shroud is kept at a relatively low temperature by the current of cooling air flowing within the shroud. Those parts of the nozzle which are subjected to the high heat of the jet are preferably made of one of the modern heat-resistant stainless steels.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claim, and all changes which come within the meaning and range of equivalency of the claim are intended to be embraced therein.

Having thus described my invention, what I claim as new and useful and desire to secure by Letters Patent is:

An adjustable nozzle comprising, in combination: an engine tailpipe terminating at its downstream end in a large discharge opening; at least six overlapping flaps formed of thin flexible metal and arranged in a substantially cylindrical shape with the upstream ends of said flaps upstream of said discharge opening; means supported on said tailpipe for continually maintaining the upstream ends of said flaps in engagement with the outer surface of the tailpipe near its downstream end; a thin metallic shroud surrounding said tailpipe and flaps and spaced therefrom sufficiently to permit the passage of cooling air along the outside of the tailpipe and flaps, said shroud being provided with a series of spaced apart openings opposite the downstream ends of said flaps; a plurality of hollow dome shaped housings secured to the outer face of said shroud over said openings; actuating members pivoted in said housings; links connecting said actuating members to the downstream ends of said flaps; and means disposed entirely outside of said shroud for simultaneously moving said actuating members to move the downstream ends of said flaps inwardly and thereby decrease the nozzle orifice by a substantial amount.

References Cited in the file of this patent

UNITED STATES PATENTS

| Number | Name | Date |
|---|---|---|
| 157,527 | Leggett | Dec. 8, 1874 |
| 186,310 | Curtis | Jan. 16, 1877 |
| 2,462,953 | Eaton et al. | Mar. 1, 1949 |
| 2,481,330 | Neal | Sept. 6, 1949 |
| 2,483,401 | Cole | Oct. 4, 1949 |
| 2,496,509 | Wolf | Feb. 7, 1950 |
| 2,546,293 | Berliner | Mar. 27, 1951 |
| 2,569,497 | Schiesel | Oct. 2, 1951 |
| 2,597,253 | Melchior | May 20, 1952 |
| 2,603,060 | Brown | July 15, 1952 |
| 2,603,062 | Weiler et al. | July 15, 1952 |

FOREIGN PATENTS

| Number | Country | Date |
|---|---|---|
| 588,501 | Great Britain | May 27, 1947 |